(12) United States Patent
Nolt

(10) Patent No.: US 6,841,785 B2
(45) Date of Patent: Jan. 11, 2005

(54) PHOTOLUMINESCENT FLOOR TILE

(75) Inventor: Robert Nolt, Lancaster, PA (US)

(73) Assignee: ND Holdings, Inc., Lancaster, MI (US)

( * ) Notice: Subject to any disclaimer, the term of this patent is extended or adjusted under 35 U.S.C. 154(b) by 0 days.

(21) Appl. No.: 10/271,243

(22) Filed: Oct. 15, 2002

(65) Prior Publication Data

US 2003/0215597 A1 Nov. 20, 2003

Related U.S. Application Data

(63) Continuation-in-part of application No. 10/147,740, filed on May 16, 2002.

(51) Int. Cl.$^7$ ............................................. B32B 9/00
(52) U.S. Cl. ..................................... 250/462.1; 428/690
(58) Field of Search ..................... 428/47, 49, 689, 428/690; 250/462.1; 252/301.16, 301.4 R

(56) References Cited

U.S. PATENT DOCUMENTS

| | | | |
|---|---|---|---|
| 2,360,516 A | 10/1944 | Schmidling | 250/80 |
| 4,058,942 A | 11/1977 | Naka | 52/179 |
| 4,360,557 A | 11/1982 | Miller | 428/142 |
| 4,401,050 A | 8/1983 | Britt et al. | 116/205 |
| 4,522,861 A | 6/1985 | Dunsworth | 428/192 |
| 4,998,391 A | 3/1991 | Connew | 52/179 |
| 5,103,608 A | 4/1992 | Andreo | 52/179 |
| 5,714,255 A | 2/1998 | Yeh | 428/364 |
| 5,763,070 A | 6/1998 | Kerlek et al. | 428/329 |
| 5,904,017 A | 5/1999 | Glatz et al. | 52/287.1 |
| 6,207,077 B1 * | 3/2001 | Burnell-Jones | 252/301.36 |
| 6,276,634 B1 | 8/2001 | Bodle | 244/118.5 |

OTHER PUBLICATIONS

Photoluminescent Vinyl Tile and Sheet Flooring, URL=http://www.safe-t-first.com/commercial/specs/spec-info/vinyl-tile-sheet-flooring.htm,2000 accessed Feb. 4, 2004.

The "Quick–Spec" guide specification format is designed to simplify the product selection, URL=http://www.brolain.com/products/safe-t-first-architects.htm, Jun. 1996 accessed Feb. 3, 2004.

* cited by examiner

Primary Examiner—Alexander S. Thomas
(74) Attorney, Agent, or Firm—Seed IP Law Group

(57) ABSTRACT

A photoluminescent tile composition made of a tile base and a matrix of photoluminescent material disbursed throughout the tile base. The tile base includes a non-transparent mineral filler. The photoluminescent material located on exposed surfaces absorb and release light. The same manufacturing methods and equipment used to manufacture conventional floor tile can be used to manufacture floor tiles from the tile composition.

12 Claims, 4 Drawing Sheets

PHOTOLUMINESCENT FLOOR TILE

This is a continuation-in-part of my co-pending U.S. application Ser. No. 10/147,740 filed May 16, 2002.

FIELD OF THE INVENTION

The invention relates to flooring, particularly flooring made from a nontransparent filler such as limestone or clay.

BACKGROUND OF THE INVENTION

Buildings are provided with emergency signs marking exits and fire escape routes. The signs direct persons out of the building in the event of fire, natural disaster or other emergency. Often, however, electric service is lost during the emergency and the building interior goes black. Persons are unable to find the escape routes or follow them, and remain in the building.

Backup lighting is often relied upon to provide illumination when electric service is lost. Backup lighting systems include batteries or emergency generators that power emergency lights. The lights are located at exits and along escape routes throughout the building.

Although valuable, backup lighting has disadvantages. The backup lighting system must provide coverage of all escape routes. Extensive coverage can be expensive to install. Preventative maintenance is critical, because the system's mechanical and electrical system components must operate reliably during the emergency. Furthermore, the system must be capable of providing sufficient illumination for sufficient time to enable escape from the building.

Because of these disadvantages, non-powered lighting systems have been developed to supplement backup lighting. These systems use photoluminescent materials to provide light. A photoluminescent material absorbs light energy and then releases the light energy when in the dark. The material absorbs light from normal ambient light and releases it during a blackout. The material "glows in the dark" independently of the backup lighting system to mark emergency exits or escape routes. The material can release light for hours, and provides failsafe lighting that complements backup lighting systems.

A conventional photoluminescent system employs laminated sheets or tiles, each tile having a light-emitting layer above a non-luminescent bottom layer. The light-emitting layer is formed from plastic or epoxy resin that incorporates a matrix of photoluminescent material. The bottom layer may be made of vinyl or epoxy and attaches the tile to a floor or wall. The light-emitting layer provides illumination.

Although photoluminescent systems are useful, there is room for improvement. Photoluminescent systems require additional labor to install them. The tiles have a relatively small surface area and can be used only in limited areas. Often the photoluminescent tiles do not provide a pleasing appearance under normal light.

Thus, there is a need for an improved photoluminescent system. The improved system should be easy to install and be labor-efficient. The photoluminescent areas should have relatively large surface area and have a pleasing appearance under normal light.

SUMMARY OF THE INVENTION

The invention is an improved photoluminescent floor tile that glows in the dark during a blackout. The improved floor tile can replace conventional floor tile and has the appearance of conventional floor tile under normal lighting. During a blackout, the entire floor glows to provide an extensive, failsafe supplemental photoluminescent lighting system.

A photoluminescent floor tile in accordance with the present invention is formed from a tile composition made from a tile base and a matrix of photoluminescent material disbursed throughout the base. The base includes a nontransparent filler, preferably a limestone or clay filler for long wear. The same manufacturing methods and equipment used to manufacture conventional floor tile can be used to manufacture the floor tiles of the present invention.

Some of the disbursed photoluminescent material is located on the top surface of the tile. This material absorbs and discharges light to and from the tile. Photoluminescent material preferably makes up between about 2 percent to about 20 percent by weight of the combined weight of the base and photoluminescent material. This provides effective particle density on the top surface of the tile. Wear of the tile exposes fresh photoluminescent material so that the tile retains its ability to glow in the dark despite heavy use.

Floors formed from the tiles of the present invention are installed in the same manner as conventional floor tiles. Installing a floor automatically installs a photoluminescent backup system at no additional labor cost.

The tiles of the present invention are not limited to just backup lighting systems. The tiles can also be combined with conventional tile to generate interesting visual displays that appear when the lights are turned off. This enables businesses to offer customers a unique and appealing light display in addition to conventional decoration schemes.

Other objects and features of the invention will become apparent as the description proceeds, especially when taken in conjunction with the accompanying drawings illustrating photoluminescent floor tiles of the present invention, of which there are four sheets of five embodiments.

DESCRIPTION OF THE PREFERRED EMBODIMENTS

Figure 1:
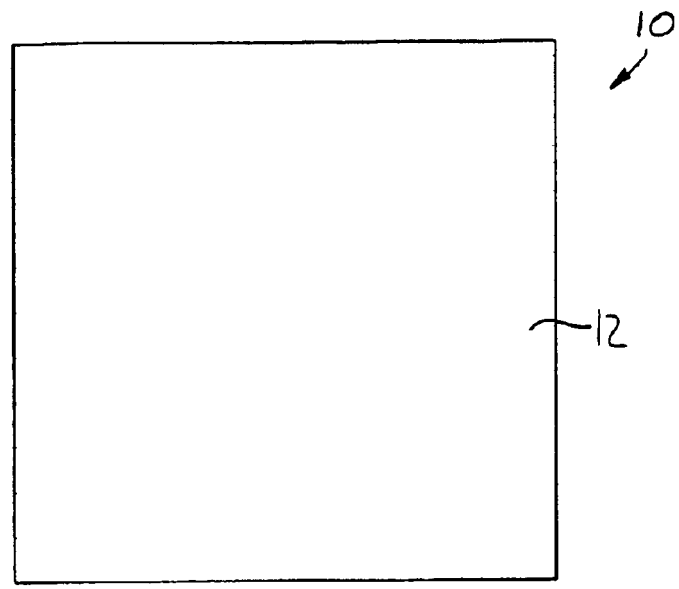
FIG. 1 is a top view of a first embodiment floor tile in accordance with the present invention.
Figure 2:
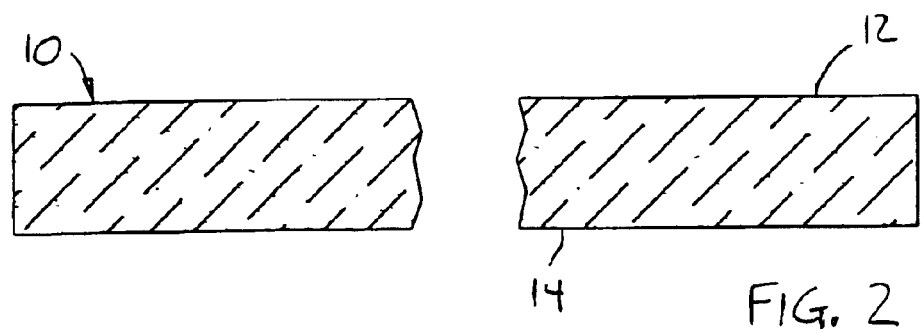
FIG. 2 is a sectional view of the floor tile shown in FIG. 1, the view taken along line 2—2 of FIG. 1.
Figure 3:
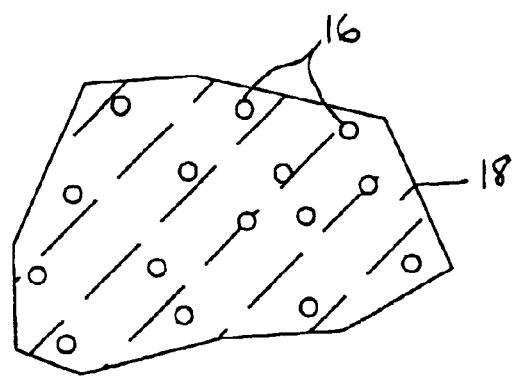
FIG. 3 is a closer view of the tile shown in FIG. 2.

FIGS. 1–3 illustrate a first embodiment floor tile 10 in accordance with the present invention. The tile has a top surface 12 and a bottom surface 14. The illustrated tile is 12 inches by 12 inches square and approximately one-tenth of an inch thick. Other embodiments of floor tile can have different shapes or dimensions.

The tile 10 is formed from a tile composition that has photoluminescent particles 16 uniformly disbursed throughout a tile base 18 (the particles 16 are represented as black dots in FIGS. 1 and 2 and represented by circles in FIG. 3). The particles 16 are firmly embedded in the base 18 and together form a rigid floor tile.

The photoluminescent particles 16 preferably consist of a non-radioactive photoluminescent pigment. A suitable pigment is formed from rare earth materials. These photoluminescent pigments are each characterized by low toxicity, short excitation time, high brightness and long glow life. One such pigment is formed from strontium aluminate having a europium activator, and may be the Series G-200, Y-200, B-200 or V-200 photoluminescent pigments available from Way2glo, Inc., Thousand Oaks, Calif. (or functional equivalents).

The photoluminescent particles form a matrix of particles 16 embedded in the base 18. The particles are disbursed throughout the thickness of the tile 10 between the top and bottom surfaces of the tile. A number of the photoluminescent particles 16, however, are located on the top surface of the tile. These particles can absorb and emit light from and to the ambient environment.

The tile base 18 is conventional and formed from resin, plasticizer and filler used in the production of conventional floor tiles. The resin and plasticizer form a thermoplastic binder system. The filler is preferably ground limestone and ground ceramic. The filler is not required to be transparent. Other colorant or ornamental particles can be added.

In general, the photoluminescent material constitutes between about 2 percent to about 20 percent by weight of the tile 10. This provides sufficient particle density on the top surface of the tile 10 to achieve satisfactory illumination levels. The proportion of photoluminescent material can be increased or decreased to modify illumination levels or to compensate for luminescence variations or particle size among different types of photoluminescent materials.

A representative tile formulation composition is:

| Material | Amount (pounds) |
| --- | --- |
| Ground limestone (60 mesh) | 112 |
| Ground limestone (80 mesh) | 144 |
| Acetate vinyl resin | 17 |
| Stabilizer | 1 |
| Vinyl Resin | 23 |
| Line remix | 65 |
| Line Dust | 37 |
| Plasticizer | 16 |
| Photoluminescent material | 106 |

The same ingredient (except for the photoluminescent material) can be used to manufacture conventional, non-self-luminescent floor tiles. Preferably the photoluminescent material is provided as a fine, free-flowing powder to facilitate mixing with the other ingredients.

The ingredients are placed in a shearing mixer and are thoroughly mixed. This ensures that the photoluminescent particles 16 are distributed evenly throughout the mixture. The mixer heats the ingredients to about 280 degrees F. The heated mixture is discharged from the mixer and passes through a roll mill to form a blanket. The blanket is about 80 mils (0.080 inch) thick. The blanket is heated and rolled several times in a conventional manner to partially cross-link the polymeric ingredients and form a finished gauge blanket. If desired, a wax overcoating can be applied in a conventional manner. The sized and finished blanket is transferred to a press that punches individual tiles 10 from the blanket.

The tiles 10 are installed in the same manner as conventional floor tile. This enables a photoluminescent backup system to be installed simultaneously with floor installation—without additional labor or installation time.

Each floor tile 10 appears to be a conventional floor tile under normal ambient lighting. The photoluminescent particles 16 on the top surface of the tile 10 absorb light from the ambient lighting. Ambient lighting can include sunlight, fluorescent lighting or incandescent lighting. Less than one hour of light exposure is typically required to charge the photoluminescent particles 16.

The particles 16 release light and supplement backup lighting during a blackout. The tile top surface 12 glows in the dark and illuminates the floor. If an entire floor were formed from tiles 10, the entire floor would be illuminated. Buildings having floors or hallways formed entirely from the tiles 10 would have the full length of escape routes illuminated. Known photoluminescent pigments can illuminate the escape routes for ten hours or more.

Figure 4:
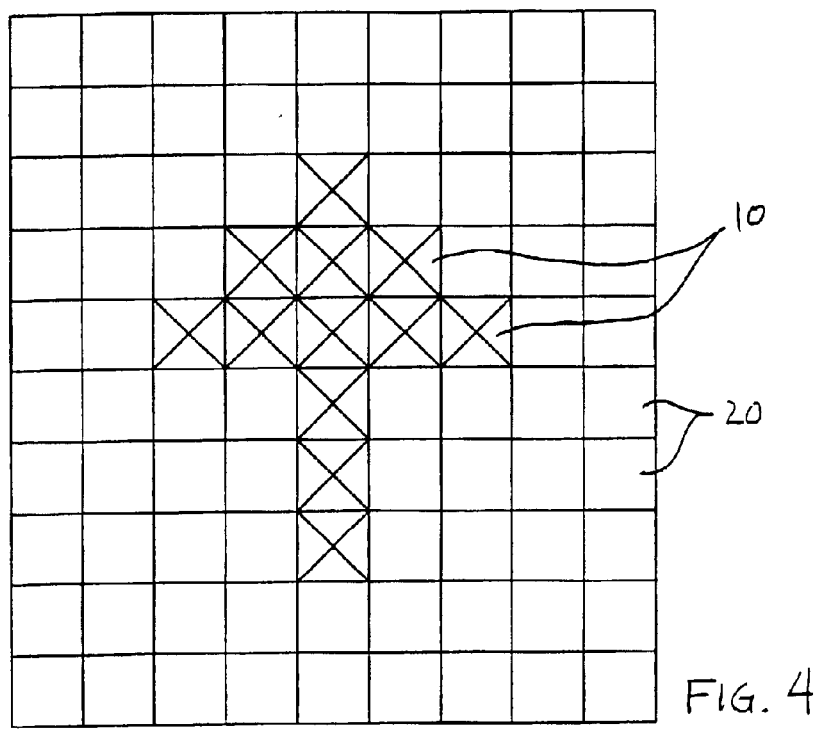
FIG. 4 is a top view of a first tile arrangement made of tiles as shown in FIG. 1 and conventional tiles.

Photoluminescent tiles 10 can also be combined with conventional non-luminescent floor tiles. FIG. 4 illustrates a floor forming a portion of an escape route. The floor includes a number of like floor tiles 10 (each shown with an "X") and non-luminescent tiles 20. The tiles 10 and 20 are otherwise identical in composition except that the tiles 10 contain the particles 16. The tiles 10 and 20 appear identical under normal light, and so the floor normally appears to be made entirely from the conventional tiles 20.

In a blackout the tiles 10 glow and illuminate an area surrounded by the dark conventional tiles. In addition to illuminating the escape route, the tiles 10 are arranged to provide useful indicia. In FIG. 4 the tiles 10 are arranged to define an arrow indicating direction along the escape route. Other indicia could be designed as desired. Tiles made of the same composition as the tile 10 but formed in other shapes could be used to form parts of the indicia.

Figure 5:
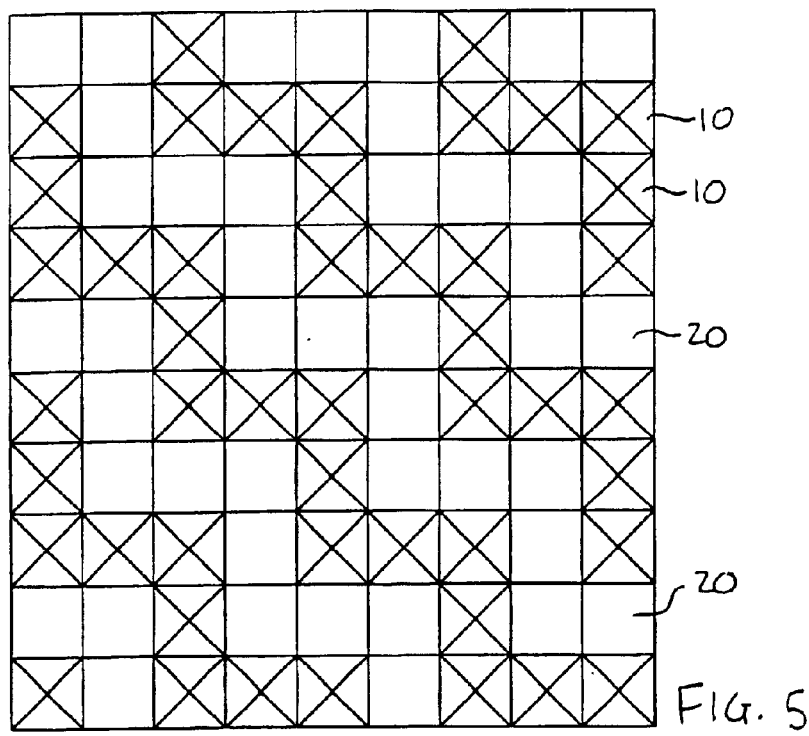
FIG. 5 is similar to FIG. 4 but illustrates a second tile arrangement.

Photoluminescent tiles 10 and non-luminescent tiles 20 can also be combined to provide special lighting effects or displays. FIG. 5 illustrates a floor in which the tiles 10 and tiles 20 are arranged in an interlocked herringbone pattern. Under normal lights the tiles 10 and 20 appear identical. The floor appears uniform with no herringbone pattern visible. Turning off the lights displays an illuminated, glow-in-the-dark herringbone pattern extending along the floor.

The tiles 10 can create floors with visually appealing light patterns that appear in the dark. In other embodiments the tiles 10 and the tiles 12 can be made from tile bases of different color and forming a first pattern when lighted and a second, entirely different, pattern when the lights are off. The number of glow-in-the-dark patterns is limited only by the imagination, and can include other bond patterns, checkerboard patterns, geometric shapes, words, or borders. Dance floors, skating rinks, outdoor sidewalks and convention centers are some of the venues that could provide entertaining floor displays for customers.

Figure 6:
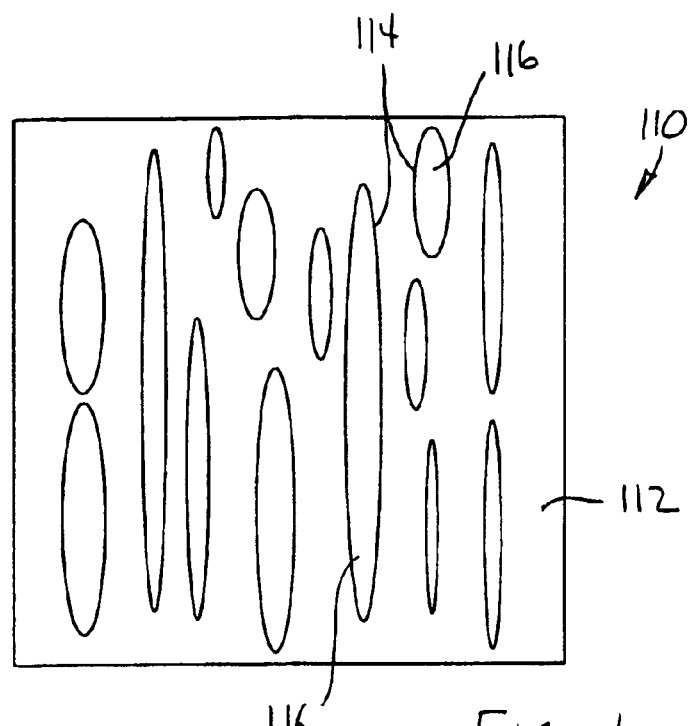
FIG. 6 is a top view of a second embodiment floor tile in accordance with the present invention.

The tile 10 has photoluminescent particles distributed throughout the entire top surface of the tile to present a uniformly illuminated tile in the dark. FIG. 6 illustrates a second embodiment floor tile 110 in accordance with the present invention. The tile 110 is similar to the tile 10 but photoluminescent particles are found only in spaced-apart regions of the tile surface.

The tile 110 includes a first base 112 formed conventionally from limestone filler. The base 112 does not contain photoluminescent particles. Disbursed throughout the base 112 are a number of veins or seams 114. The veins 114 are distributed throughout the thickness of the tile 110 and are formed from a second base 116. The second base 116 is like the base 18 and includes a matrix of photoluminescent particles.

The bases 112 and 116 preferably include contrasting coloring agents to give a mottled appearance to the tile 110. The coloring agents can be the same as used in conventional mottled tile. The base 112 is usually a lighter color than the base 116.

The photoluminescent particles in the surface veins 114 located on the surface of the tile 110 absorb and emit light as previously described for the tile 10. Under normal lighting the tile 114 appears identical to a conventional mottled tile. In the dark, the veins 114 on the surface of the tile emit light and glow in the dark. The surface area of the veins 114 is sufficient to provide adequate illumination.

The base 112 can be made from the same ingredients listed above for the base 18 but without the photoluminescent material. The base 116 can be made from the same ingredients as the base 18.

The same manufacturing methods and equipment used to manufacture conventional mottled floor tile can be used to manufacture the floor tiles 110. The base 116 is heated, mixed and rolled into a blanket as previously described for the base 18. The blanket is sent to a crusher that breaks the blanket into pieces. The broken pieces are stored for later processing.

The ingredients for the base 112 are placed into the shearing mixer and are heated and mixed. Broken pieces of the base 116 are then added to the mixer. Typically the broken pieces make up about one-third of the entire mixture by weight. The entire mixture is then mixed for about an additional 40 seconds. This ensures the broken pieces are disbursed throughout the mixture.

The mixture is discharged and processed into tiles as previously described. The pieces of the base 116 form the elongate veins 114 disbursed throughout the base 112. These veins 114 are represented as ellipses in FIG. 6 and form a jaspe or striated tile appearance.

Figure 7:
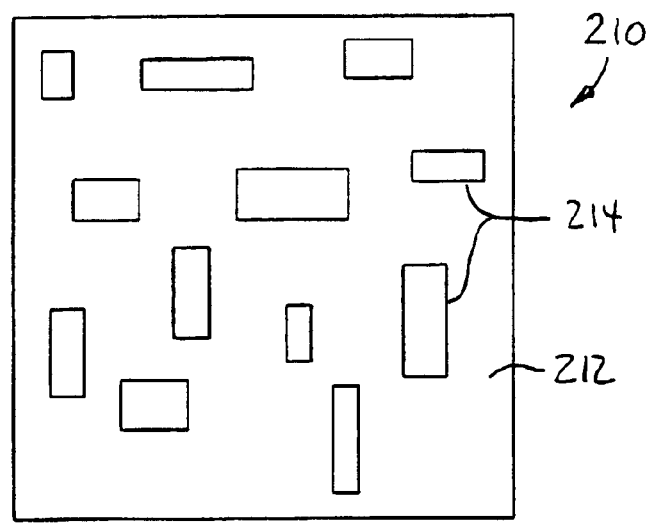
FIG. 7 is a top view of a third embodiment floor tile in accordance with the present invention.

FIG. 7 illustrates a third embodiment floor tile 210 in accordance with the present invention. The tile 210 includes a base 212 like the base 112 and veins 214 similar to the veins 114. The tile 210 has the same composition as the tile 110 and is made the same way except that the crushed pieces forming the veins 114 are mixed in the mixer for only 40 seconds. The resulting tile 210 has a marbled appearance, as represented by the rectangles representing the veins 214.

In other embodiments of mottled tile each of the bases may include a matrix of photoluminescent particles. Under normal lighting the tile would have a mottled appearance. In darkness the entire top surface of the tile would glow.

Figure 8:
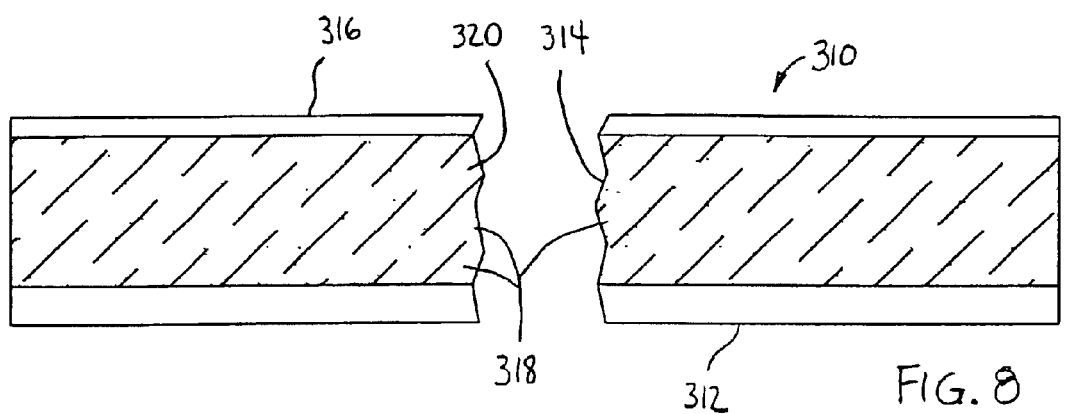
FIG. 8 is a view similar to FIG. 2 of a fourth embodiment floor tile in accordance with the present invention.

FIG. 8 illustrates a fourth embodiment floor tile 310 in accordance with the present invention. The floor tile 310 is similar to the floor tile 10 but includes a substrate or carrier 312. The lower surface of a wear layer 314, having the same composition as the floor tile 10, is bonded to the carrier 312. A tile overcoating 316 covers the upper surface of the wear layer 314. The overcoating 316 is preferably a clear, thin film of urethane or wax. For clarity the relative thicknesses of the substrate, wear layer and overcoating are not drawn to scale.

The substrate 312 and the overcoating 316 are the same as that used in the manufacture of conventional non-luminescent vinyl tile flooring and so will not be described further. The wear layer 314 includes photoluminescent particles 318 (like the particles 16) disbursed throughout a tile base 320 (like the tile base 18). The areal density of photoluminescent particles 318 on the top surface of the wear layer is preferably the same as that on the top surface of the tile 10.

The tile 310 is manufactured in a manner similar to that of the tile 10. The tile base and the photoluminescent particles are mixed together and heated to cross-link the polymeric ingredients as previously described. The blanket formed from the tile base and photoluminescent particles mixture is applied to the substrate 312. The blanket and substrate are bonded or fused together in the same manner as used in manufacturing conventional tile (typically by calendaring or heating or both), and the overcoating is applied.

The tile 310 may also be manufactured by mixing the tile base and the photoluminescent particles together and applying the mixture without heating to the substrate. The mixture and substrate are then bonded together by calendaring or heating (or both) and the overcoating is applied.

In yet other embodiments similar to the floor tile 310, a blanket or tile base and photoluminescent particle mixtures used to form mottled floor tiles can be bonded to the substrate.

Figure 9:
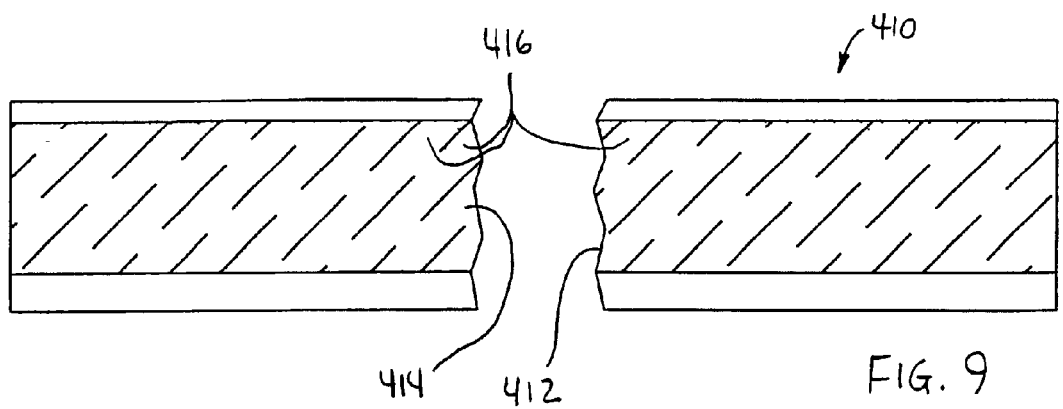
FIG. 9 is a view similar to FIG. 2 of a fifth embodiment floor tile in accordance with the present invention.

FIG. 9 illustrates a fifth embodiment floor tile 410 in accordance with the present invention. The floor tile 410 is similar to the floor tile 310 and differs only in its wear layer 412. The wear layer 412 includes a nonluminescent tile base 414 (like the tile base 18) with photoluminescent particles 416 (like the particles 16) disbursed through the tile base.

Unlike the previous embodiments, the photoluminescent particles 416 are not disbursed throughout the entire thickness of the tile base 414. Instead, the particles 416 are limited to an upper portion of the tile base adjacent the upper surface of the tile as shown in the figure. The areal density of photoluminescent particles 416 on the top surface of the wear layer is preferably the same as that of the wear layer 314.

To form the tile 410, the tile base 414 ingredients are mixed and formed into a blanket as in making a conventional tile. The photoluminescent particles 416 are "dusted" or distributed over the top surface of the blanket. The dusted blanket is rolled to embed and disburse the particles into the upper portion of the blanket. Other materials to decorate or color the upper surface of the blanket can also be dusted onto the blanket. The finished gauge blanket is then overcoated and the tiles are punched from the blanket as previously described.

A mottled photoluminescent tile can be achieved by dusting only spaced apart areas of the blanket with the photoluminescent material.

In an alternative method of manufacture of the tile 410, a blanket formed from a mixture of tile base ingredients and photoluminescent particles, like the mixture forming the tile 10, is placed on top of a blanket formed from a mixture of tile base ingredients without photoluminescent particles. The two blankets are heated and rolled several times in a conventional manner to partially cross-link the polymeric ingredients and form a single finished gauge blanket.

The upper blanket can be similar to those used to form mottled floor tiles to provide a mottled photoluminescent tile.

In yet other embodiments of the present invention the tile base may be suitable for manufacturing ceramic tile. A ceramic tile base is formed from a clay filler mixed with other ingredients, including quartz, kaolin, talc and the like. The mixture is molded into tiles and the tiles are glazed and fired in an oven or kiln. A ceramic tile composition in accordance with the present invention includes photoluminescent material mixed or dusted with the ceramic tile base. The photoluminescent material illuminates the exposed surfaces of the tiles as described for the tile embodiments described above. Photoluminescent ceramic tile of the present invention is otherwise manufactured using the same equipment and methods as nonluminescent ceramic tile, and can be installed like conventional ceramic tile.

The photoluminescent material must be capable of withstanding firing temperatures. Strontium aluminate pigments, for example, are suitable for ceramic tiles because such pigments typically do not dissociate at temperatures less than 1200 degrees Centigrade.

The photoluminescent material can make up by weight more than 20 percent of the ceramic tile composition. Generally, ceramic tile compositions are not as dense as limestone tile compositions. The same volume ratio of photoluminescent material to the entire tile composition mixture results in a greater percentage by weight of photoluminescent material in the ceramic tile composition than in the limestone tile composition.

While I have illustrated and described preferred embodiments of my invention, it is understood that these are capable of modification, and I therefore do not wish to be limited to the precise details set forth, but desire to avail myself of such changes and alterations as fall within the purview of the following claims.

What is claimed is:

1. A rigid tile comprising:
    a non-photoluminescent substrate;
    a wear layer having a top surface, and a bottom surface, said bottom surface being bonded to said substrate;
    a non-transparent inorganic material within said wear layer and forming a substantial portion of said wear layer;
    a thermoplastic resinous binder within said wear layer, the weight of said inorganic material being substantially greater than the weight of said resinous binder, the ratio of said inorganic material and said resinous binder being about 4.5; and
    a photoluminescent material within at least an upper portion of said wear layer, adjacent to the top surface such that said wear layer illuminates after ambient light has been removed.

2. The tile according to claim 1 wherein said inorganic material is approximately 65% of the total weight of said wear layer.

3. The tile according to claim 1 wherein said resinous binder is approximately 15% of the total weight of said wear layer.

4. The tile according to claim 1 wherein said photoluminescent material is approximately 20% of the total weight of said wear layer.

5. The tile according to claim 1 wherein said inorganic material within the wear layer is limestone.

6. The tile according to claim 1 wherein said resinous binder is one or more vinyl resins.

7. The tile according to claim 1 wherein the photoluminescent material is dispersed within said wear layer as fine particles.

8. The tile according to claim 7 wherein the photoluminescent material is dispersed through out the entire thickness of the wear layer.

9. The tile according to claim 8 wherein the wear layer further comprising an upper portion adjacent to the top surface and a lower portion adjacent to the bottom surface and wherein the photoluminescent material is dispersed only in the upper portion of said wear layer.

10. The tile according to claim 1 wherein the substrate is a vinyl tile flooring material.

11. The tile according to claim 1 further including an overcoating layer positioned over said wear layer.

12. The tile according to claim 11 wherein said overcoating layer is transparent.

* * * * *

UNITED STATES PATENT AND TRADEMARK OFFICE
CERTIFICATE OF CORRECTION

PATENT NO. : 6,841,785 B2
DATED : January 11, 2005
INVENTOR(S) : Robert Nolt

It is certified that error appears in the above-identified patent and that said Letters Patent is hereby corrected as shown below:

Title page,
Item [73], Assignee, "Lancaster, MI" should read as -- Lancaster, PA --.

Signed and Sealed this

Twenty-seventh Day of September, 2005

JON W. DUDAS
*Director of the United States Patent and Trademark Office*